United States Patent
Alahari et al.

(10) Patent No.: US 11,492,497 B2
(45) Date of Patent: Nov. 8, 2022

(54) PRIMER TOPCOAT

(71) Applicant: BEHR PROCESS CORPORATION, Santa Ana, CA (US)

(72) Inventors: Venkateswararao Alahari, Irvine, CA (US); Ying-Chieh Yen, Irvine, CA (US); John Gilbert, Orange, CA (US); Cecilia Dinh, Anaheim, CA (US); Tom Hok, Long Beach, CA (US); Feleshia Kappadakunnel, Cerritos, CA (US); Sachin Gopalarao Lalge, Karnataka (IN)

(73) Assignee: Behr Process Corporation, Santa Ana, CA (US)

( * ) Notice: Subject to any disclaimer, the term of this patent is extended or adjusted under 35 U.S.C. 154(b) by 86 days.

(21) Appl. No.: 16/695,804

(22) Filed: Nov. 26, 2019

(65) Prior Publication Data

US 2021/0155805 A1 May 27, 2021

(51) Int. Cl.
| | |
|---|---|
| C09D 5/00 | (2006.01) |
| C08K 3/013 | (2018.01) |
| C08K 3/22 | (2006.01) |
| C08K 3/26 | (2006.01) |
| C08K 3/36 | (2006.01) |
| C08L 25/08 | (2006.01) |
| C08L 33/08 | (2006.01) |
| C08L 33/10 | (2006.01) |
| C09D 133/08 | (2006.01) |
| C09D 133/10 | (2006.01) |

(52) U.S. Cl.
CPC .............. *C09D 5/002* (2013.01); *C08K 3/013* (2018.01); *C08K 3/22* (2013.01); *C08K 3/26* (2013.01); *C08K 3/36* (2013.01); *C08L 25/08* (2013.01); *C08L 33/08* (2013.01); *C08L 33/10* (2013.01); *C09D 133/08* (2013.01); *C09D 133/10* (2013.01); *C08K 2003/2241* (2013.01); *C08K 2003/2296* (2013.01); *C08K 2003/265* (2013.01); *C08L 2205/02* (2013.01)

(58) Field of Classification Search
CPC .... C09D 5/002; C09D 133/04; C09D 133/08; C09D 133/10; C09D 133/12; C08L 25/08; C08L 25/14; C08L 2205/02; C08K 5/02
See application file for complete search history.

(56) References Cited

U.S. PATENT DOCUMENTS

| | | | |
|---|---|---|---|
| 5,385,960 A | 1/1995 | Emmons et al. | |
| 6,020,435 A * | 2/2000 | Blankenship | C08F 291/00 525/256 |
| 6,080,802 A | 6/2000 | Emmons et al. | |
| 7,488,534 B2 | 2/2009 | Koller et al. | |
| 8,318,848 B2 | 11/2012 | Finegan et al. | |

FOREIGN PATENT DOCUMENTS

| | | | | |
|---|---|---|---|---|
| CN | 104610828 A | * | 5/2015 | |
| CN | 105440820 A | * | 3/2016 | |
| CN | 108715719 A | | 10/2018 | |
| CN | 109370337 A | | 2/2019 | |
| EP | 3175994 A2 | * | 6/2017 | ........... C09D 125/14 |

OTHER PUBLICATIONS

Machine translation of CN 104610828 (2015, pages).*
Triton CF-10 MSDS, Dow, 2014, 8 pages.*
Ren (Building Decorative Materials, Ren, Chapter 13: Architectural Coatings, 43 pages, specifically p. 300).*
Rhopaque Ultra E, Dow, Mar. 2014, 6 pages.*
Primal SG-380, 2021, 3 pages.*
Machine translation of CN 105440820 (2016, 7 pages).*
Google patents translation of CN 105440820 (2016, 12 pages).*
Minex (Improved Wet Scrub Resistance of Waterborne Coatings Formulated with MINEX Functional Fillers, Minex, 2014, 4 pages).*
International Search Report for PCT Appn. No. PCT/US2020/062305 filed Nov. 25, 2020, 39 pgs.

* cited by examiner

*Primary Examiner* — Brieann R Johnston
(74) *Attorney, Agent, or Firm* — Brooks Kushman P.C.

(57) ABSTRACT

A primer topcoat paint composition that can be applied to a surface without the need to apply separate primer and topcoat layer is provided. The primer topcoat paint composition includes a first acrylic copolymer that is not a styrene acrylic copolymer, a second acrylic copolymer that is a styrene acrylic copolymer, and water. Characteristically, the first acrylic copolymer is present in the primer topcoat paint composition in an amount by weight that is at least 5 times greater than that of the second acrylic copolymer percent based on total first acrylic copolymer and second acrylic copolymer solids.

22 Claims, 8 Drawing Sheets

Table 2. Test properties description.

| | Formula | Test Condition | Test Purpose | ASTM Reference | Abbreviations |
|---|---|---|---|---|---|
| Topcoat Properties | Contrast Ratio | 3 mil DD, AD | Measurement of opacity of a coating over a contrasting substrate. Higher number denotes more hiding. | D2805 | 3 mil wet thickness DD - Drawdown AD - Air Dry |
| | Reflectance | 3 mil DD, AD | Measurement of reflecitivity of light from a painted surface. Higher numbers denotes more reflectivity and, generally, whiteness. | | 3 mil wet thickness DD - Drawdown AD - Air Dry |
| | Yellowness Index | 3 mil DD, AD | Measurement of visual yellowness of the coating. Higher numbers denote more yellowness. | E313 | 3 mil wet thickness DD - Drawdown AD - Air Dry |
| | Sag Resistance | 4-24 mil DD, AD | Ability of the coating to resist vertical sagging at varied mil thicknesses. Higher numbers denote more sag resistance. | D4400 | 4-24 mil Precision Sag bar DD - Drawdown AD - Air Dry ND - No dripping SD- Slight dripping |
| | Leveling | Leveling bar DD, AD | Ability of the coating to flow into a smooth finish after application. Higher number denotes better leveling properties. | D4062-99 | Leneta leveling bar DD - Drawdown AD - Air Dry |
| | Block Resistance | 3 mil DD, AD ON (RT/OVEN) | Ability of the coating to resist sticking to itself. | D4946 | RT - Room Temperature Oven - 120F Temperature DD - Drawdown AD - Air Dry ON - Overnight cure |
| | Scrub Resistance | Scrub panel, 7 day AD | Ability of a coating to maintain durability after scrubbing. Reported as percentage compared to CTRL (Control); number of actual cycles also listed. | D2486 | AD - Air Dry |

*Fig. 1A*

|  | | | | |
|---|---|---|---|---|
| Primer Properties | Behr Stain Resistance | Scrub panel, 7 day AD | Ability of a coating to resist staining from a variety of household stains. Stains tested include #2 pencil, lipstick, crayon, washable marker, ballpoint pen, red wine, mustard, ketchup, coffee. Data reported as positive or negative vs ctrl performance. | D3450 D4828 | AD - Air Dry |
|  | Stain Blocking – Marker Stain | Visual | Ability to prevent staining from a variety of markers from surfacing and being visible. Data reported as positive or negative vs ctrl performance. | | |
|  | Stain Blocking - ML | Visual / DE | Ability to prevent staining from a variety of household stains from surfacing and being visible. Stains tested include permanent marker, crayon, and lipstick. Data reported as positive or negative vs ctrl. Number data is DE, where DE is color difference between the stained surface and the unaltered surface. | | DE - Delta E |
|  | Enamel Holdout | 3050 gloss vs CTRL | Gloss development potential of a topcoat over a primer. In this case the samples are used as the primers and 3050 is coated on top as the topcoat. Gloss measurement of 3050 is taken over the bare substrate and over the primed substrate. Percentage reported is the difference of the sample vs the noted ctrl. A higher percentage means the topcoat is better able to develop its full gloss over the sample as compared to the noted ctrl. | D7786-13 | |
|  | Green Alkyd Adhesion | ON | Ability of a coating to adhere to a glossy alkyd substrate. Rating scale is ASTM standard ranging from 0B to 5B with 5B having the best adhesion. Tested both dry and wet (10 minutes wet paper towel over coating, 10 minutes air dry). | D6900-10 | ON - Overnight |

*Fig. 1B*

Table 3. Properties for a paint coating formed from the flat white composition.

| | Formula | Test Condition | PR31099 EX v.8 (PROD) | 180134-FW-PR310 v.34 (ARF) | 180134-FW-PR310 v.34 (ARF) | 180134-200099 EX v.45 (ARF) |
|---|---|---|---|---|---|---|
| | | | PR310 | KPT Prototype | | Kilz 2 |
| Topcoat Properties | Contrast Ratio | 3 mil DD, AD | 98.14 | 98.18 | | |
| | Reflectance | 3 mil DB, AD | 91.96 | 90.96 | | |
| | Yellowness Index | 3 mil DD, AD | 3.17 | 3.5 | | |
| | Sag Resistance | 4-24 mil DB, AD | 14 ND | 24 ND | | |
| | Leveling | Leveling bar DB, AD | 5 | 5 | | |
| | Block Resistance | 3 mil DD, AD ON (RT/Oven) | 10/10 | 10/10 | | 9/7 |
| | Scrub Resistance | Scrub panel, 7 day AD | CTRL | 83% 122 cycles (vs 144 CTRL) | | 169% 215 cycles (vs 115 CTRL) |
| | Behr Stain Resistance | Scrub panel, 7 day AD | CTRL | - Washable Marker | | - Pencil |
| | Stain Blocking – Marker Stain | Visual | Worse | Comparable | | CTRL |
| Primer Properties | Stain Blocking – ML | Visual / DE | Crayon: ~ / 0.80 Bl. Perm. Marker: ~ / 1.65 Lipstick: ~ / 7.8 | Crayon: ~ / 0.62 Bl. Perm. Marker: ~ / 0.76 Lipstick: ~ / 7.8 | | Crayon: 0.98 Bl. Perm. Marker: 0.1.98 Lipstick: 5.44 |
| | Enamel Holdout | 3050 gloss vs CTRL | 59.57% (5/28/48) | 68.75% (6/33/55) | | CTRL (14/49/82) |
| | Green Alkyd Adhesion | ON | 5B/5B | 5B/5B | | 5B/5B |

Fig. 2

Table 5. Properties for a paint coating formed from the eggshell white composition

| | Formula | Test Condition | PR33099 EX v. 9 (PROD) | 180134-KPP-ESW-EX v.12 | 180134-200099 EX v.45 (ARF) |
|---|---|---|---|---|---|
| Topcoat Properties | | | PR330 | KPT Prototype | Kilz 2 |
| | Contrast Ratio | 3 mil DD, AD | 97.67 | 97.14 | |
| | Reflectance | 3 mil DD, AD | 90.26 | 90.78 | |
| | Yellowness Index | 3 mil DD, AD | 3.22 | 2.49 | |
| | Sag Resistance | 4-24 mil DD, AD | 24 ND | 24 ND | |
| | Leveling | Leveling bar DD, AD | 2 | 3 | |
| | Block Resistance | 3 mil DD, AD ON (RT/Oven) | 10/6 | 10/8 | 10/8 |
| | Scrub Resistance | Scrub panel, 7 day AD | CTRL | 75% 156 cycles (vs 192 CTRL) | 83% 180 cycles (vs 135 CTRL) |
| | Behr Stain Resistance | Scrub panel, 7 day AD | CTRL | =/Red wine, mustard, ketchup | Pencil, lipstick, crayon + red wine, mustard, coffee |
| Primer Properties | Stain Blocking – Marker Stain | Visual | Slightly Weaker | Comparable | CTRL |
| | Stain Blocking - ML | Visual / DE | Crayon: =/0.46 Bl. Perm. Marker: =/0.57 Lipstick: =/17.52 | Crayon: =/0.46 Bl. Perm. Marker: =/0.69 Lipstick: =/17.57 | Crayon: 0.46 Bl. Perm. Marker: 0.48 Lipstick: 14.38 |
| | Enamel Holdout | 3080 gloss vs CTRL | 83.92% | 83.00% | CTRL |
| | Green Alkyd Adhesion | ON | 5B/5B | 5B/5B | 5B/5B |

Fig. 3

Table 7. Properties of a paint coating formed from the semi-gloss white composition

| | | Formula | Test Condition | PR37099 EX v.14 (PROD) | 180134-SGW-PR370 V.22(ARF) | | 80134-20R099 EX v.45 (ARF) |
|---|---|---|---|---|---|---|---|
| | | | | PR370 | KPT Prototype | | Kilz 2 |
| Topcoat Properties | | Contrast Ratio | 3 mil BD, AD | 97.56 | 97.19 | | |
| | | Reflectance | 3 mil BD, AD | 93.98 | 93.25 | | |
| | | Yellowness Index | 3 mil BD, AD | 2.25 | 2.69 | | |
| | | Sag Resistance | 4-24 mil DD, AD | 18ND | 18ND | | |
| | | Leveling | Leveling bar DD, AD | 7 | 10 | | |
| | | Block Resistance | 3 mil BD, AD ON (RT/Oven) | 9/7 | 7/5 | | 9/8 |
| | | Scrub Resistance | Scrub panel, 7 day AD | Control | | | |
| | | Behr Stain Resistance | Scrub panel, 7 day AD | Control | + Lipstick<br>Sl. - Crayon<br>Sl. + Ballpoint Pen<br>+ Red Wine<br>+ Mustard | | Pencil<br>Lipstick<br>Crayon<br>Ballpoint Pen<br>Red Wine<br>Mustard<br>Coffee |
| | | Stain Blocking – Marker Stain | Visual | Comparable | Comparable | | CTRL |
| Primer Properties | | Stain Blocking - ML | Visual / DE | Crayon: ≈ / 0.80<br>Bl. Perm. Marker: - / 1.65<br>Lipstick: - / 7.8 | Crayon: ≈ / 0.62<br>Bl. Perm. Marker: ≈ / 0.76<br>Lipstick: ≈ / 7.8 | | Crayon: 0.98<br>Bl. Perm. Marker: 0.1.98<br>Lipstick: 5.44 |
| | | Enamel Holdout | 3050 gloss vs CTRL | 59.57% (5 / 28 / 48) | 68.75% (6 / 33 / 55) | | CTRL (14 / 49 / 82) |
| | | Green Alkyd Adhesion | ON | 5B/5B | 5B/5B | | 5B/5B |

Fig. 4

Table 9. Properties for a paint coating formed from the deep flat paint composition

| | Formula | Test Condition | PR31399 EX v.5 (PROD) | 180134-FD-PR313 v.8(ARF) | 180134-FD-PR313 v.45 (ARF) EX 180134-200099 |
|---|---|---|---|---|---|
| Topcoat Properties | Gloss | 3 mil DD, 7 Day AD | PR310 | KPT Prototype | Kilz 2 |
| | Sag Resistance | 4-24 mil DD, AD | 0.3/0.8/0.8 | 0.3/0.8/0.9 | |
| | Leveling | Leveling bar DD, AD | 14ND | 14ND | |
| | Block Resistance | 3 mil DD, AD ON (RT/Oven) | 7 | 8 | |
| | Scrub Resistance | Scrub panel, 7 day AD | 10/10 | 10/10 | 9/8 |
| | Behr Stain Resistance | Scrub panel, 7 day AD | CTRL | 45% 113 cycles (vs. 236 CTRL) | 49% 122 cycles (vs. 248 CTRL) |
| | Stain Blocking – Marker Stain | Visual | CTRL | - Lipstick | - Pencil + Lipstick |
| | Stain Blocking - ML | Visual / DE | Slightly weaker | Slightly weaker | CTRL |
| Primer Properties | Enamel Holdout | 3050 gloss vs CTRL | Crayon: = / 0.15 Bl. Perm. Marker: = / 0.24 Lipstick: - / 5.81 | Crayon: = / 0.22 Bl. Perm. Marker: = / 0.21 Lipstick: - / 4.87 | Crayon: CTRL / 0.16 Bl. Perm. Marker: CTRL / 0.33 Lipstick: CTRL / 1.66 |
| | | | 72.7% 6.5 / 34.9 / 49.9 | 58.85% 5.1 / 28.5 / 43.5 | CTRL 13.2 / 49.1 / 80.5 |
| | Green Alkyd Adhesion | ON | 5/5 | 5/5 | 5/5 |

Fig. 5

Table 11. Paint coating formed from the eggshell deep paint composition

| | Formula | Test Condition | PR33399 EX 1 (PROD) | 180134-ESD-PR333 v.4 (ARF) | 180134-200099 EX V.45 |
|---|---|---|---|---|---|
| Topcoat Properties | | | PR333 | KPT Prototype | Kilz2 |
| | Sag Resistance | 4-24 mil DD, AD | 24 | 24 | - |
| | Leveling | Leveling bar DD, AD | 4 | 3 | - |
| | Brushed Leveling | | 7 | 6 | - |
| | Block Resistance | 3 mil DD, AD ON (RT/Oven) | 7/2 | 7/5 | - |
| | Scrub Resistance | Scrub panel, 7 day AD | CTRL | 135% 564 cycles (vs 417 CTRL) | 416/643 65% |
| | Dry to Touch | | 44 minutes | 44 minutes | - |
| | C15L15, 7 mils, ASTM D3450 Thin Stain | Scrub panel, 7 day AD | CTRL | = | - |
| | Behr Stain Resistance | Scrub panel, 7 day AD | CTRL | Better Lipstick,Crayon,pencil,Redvine,Ballpoint pen and Mustard | - |
| Primer Properties | Stain Blocking – Marker Stain Vs Kilz2 | Visual | Sl-ve | Sl-ve | Sl-ve |
| | Enamel Holdout | 3050 gloss vs CTRL | | 110% | - |
| | Green Alkyd Adhesion | ON | 4B/4B | 5B/5B | - |

Fig. 6

Table 13. Properties for a paint coating formed from the semi-gloss deep paint composition

| | Test Condition | PR373 EX v.1 (PROD) | 180134 SGD v.10 (ARF) | 200099 EX v.45 (PROD) |
|---|---|---|---|---|
| | | PR373 | Prototype | Kilz 2 |
| Topcoat Properties | Contrast Ratio | 3 mil DD, AD | 98.14 | 98.18 | |
| | Reflectance | 3 mil DD, AD | 91.96 | 90.96 | |
| | Yellowness Index | 3 mil DD, AD | 3.17 | 3.5 | |
| | Sag Resistance | 4-24 mil DD, AD | 24 | 24 ND | |
| | Leveling | Leveling bar DD, AD | 4 | 4 | |
| | Block Resistance | 3 mil DD, AD ON (RT/Oven) | 2/1 | 6/4 | |
| | Scrub Resistance | Scrub panel, 7 day AD | CTRL | 94% | 169% 215 cycles (vs 115 CTRL) |
| | Behr Stain Resistance | Scrub panel, 7 day AD | CTRL | - Ball point pen and - Red Wine | |
| | Stain Blocking – Marker Stain | Visual | Weaker | Weak | CTRL |
| | Stain Blocking - ML | Visual / DE | | | |
| | Enamel Holdout | 3050 gloss vs CTRL | | | |
| Primer Properties | Green Alkyd Adhesion | ON | 5B/5B | 5B/5B | 5B/5B |

*Fig. 7*

PRIMER TOPCOAT

TECHNICAL FIELD

In at least one aspect, the present invention is related to paint compositions that do not require a separate primer and topcoat.

BACKGROUND

Paint coatings are ubiquitous finding numerous applications for both aesthetic and functional applications. In many applications, paint coatings are applied to improve the aesthetic appeal of a surface by providing a uniform and pleasing appearance.

In this regard, it is known that many coating compositions do not cover substrate well when the substrate is colored. In these situations, a primer and multiple coatings are frequently necessary leading to extra expense and significantly longer times to paint a surface. Moreover, many coatings formed from the prior art paint compositions are easily stained and difficult to clean once stained.

Accordingly, there is a need for paint compositions with improved hiding power and stain resistance when applied to a substrate.

SUMMARY

In at least one aspect, the present invention provides a primer topcoat paint composition that can be applied to a surface with the need have applying separate primer and topcoat layer. The primer topcoat paint composition includes a first acrylic copolymer that is not a styrene acrylic copolymer, a second acrylic copolymer that is a styrene acrylic copolymer, and water. Characteristically, the first acrylic copolymer is present in the primer topcoat paint composition in an amount by weight that is at least 5 times greater than that of the second acrylic copolymer.

In another aspect, a method of coating a substrate with the primer topcoat paint composition set forth herein is provided. The method includes a step of applying the primer topcoat paint composition to a substrate surface to form a coated substrate and then allowing the coated substrate to dry at ambient temperature. Characteristically, the primer topcoat paint composition is applied with applying separate primer and topcoat coatings.

In another aspect, the paint composition provides a primer which does not need to be top-coated.

In another aspect, the paint composition delivers properties expected of a primer including sealing, adhesion, hiding, stain blocking, and tintablility.

In another aspect, the paint composition is scrubbable and washable with a tackiness level similar to opening price point level paint In another aspect, the paint composition can be provided in a white base composition and a medium base composition.

In another aspect, the paint composition can be provided in three sheens flat, satin, semi-gloss sheens.

In still another aspect, the paint composition dries in about 30 minutes to the touch and in about an hour for recoating.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIGS. 1A and 1B. Table 2 provides a description of the test methods and abbreviations used in the tables of FIGS. 2 to 7.

FIG. 2. Table 3 which provides a summary of the measured properties for the flat white composition.

FIG. 3. Table 5 which provides a summary of the measured properties for the eggshell white composition.

FIG. 4. Table 7 which provides a summary of the measured properties for the semi-gloss white composition.

FIG. 5. Table 9 which provides a summary of the measured properties for the deep flat paint composition.

FIG. 6. Table 11 which provides a summary of the measured properties for the eggshell deep paint composition.

FIG. 7. Table 13 which provides a summary of the measured properties for the semi-gloss deep paint composition.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g. pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

Throughout this application, where publications are referenced, the disclosures of these publications in their entireties are hereby incorporated by reference into this application to more fully describe the state of the art to which this invention pertains.

Throughout this application, the amounts of all components of the primer topcoat paint compositions are weight percentages of the total weight of the primer topcoat paint composition. Moreover, all weights of polymeric or copolymeric components are solids weights.

In an embodiment, a primer topcoat paint composition with improved hiding and stain resistance is provided. The primer topcoat paint composition includes a first acrylic copolymer that is not a styrene acrylic copolymer, a second acrylic copolymer that is a styrene acrylic copolymer, and water. In a refinement, the primer topcoat paint composition is a latex paint (i.e., an emulsion) The first acrylic copolymer In a refinement, the first acrylic copolymer is a nearly 100 percent acrylic copolymer (e.g., greater than 95% acrylic copolymer. In another refinement, the first acrylic copolymer has a minimum film forming temperature less than about 20° C. In this context, an acrylic copolymer is any polymer formed from at least one acrylate monomer.

Characteristically, the first acrylic copolymer is present in the primer topcoat paint composition in an amount by weight that is at least 5 times greater than that of the second acrylic copolymer. In a refinement, the first acrylic copolymer is present in the primer topcoat paint composition in an amount by weight that is at least, in increasing order of preference 3, 4, 5, 7, or 10 times greater than that of the second acrylic copolymer. In a further refinement, the first acrylic copolymer is present in the primer topcoat paint composition in an amount by weight that is at most, in increasing order of preference 20, 15, 12, 10, or 8 times greater than that of the second acrylic copolymer.

In a variation, the first acrylic copolymer and second acrylic copolymer are independently added to the primer topcoat paint composition as an emulsion copolymer. In a refinement, the first acrylic copolymer nearly 100% acrylic and is formed from one or more or any combination of monomers selected from the group consisting of methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropylacrylate, bis-(2,2, 2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl methacrylate, 1H,1H,3H-hexafluorobutyl methacrylate, 1H,1H,5H-octafluoropentyl methacrylate, ethylene, propylene, 1-butylene, 2 butylene, vinyl acetate, functional monomers (e.g., phosphorous-containing monomers), acid group monomers, and combinations thereof. Specific examples of phosphorus-containing functional monomers are disclosed in U.S. Pat. Nos. 5,385,960; 6,080,802; 7,488,534; and 8,318,8483; the entire disclosures of which are hereby incorporated by reference. Examples of acidic group monomers are disclosed in U.S. Pat. No. 6,080,802.

In another refinement, the second copolymer is formed from substituted or unsubstituted styrene (e.g., for example C1-10 alkyl, halogen, etc. as set forth above) and one or more or any combination of monomers selected from the group consisting of methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropylacrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl methacrylate, 1H,1H,3H-hexafluorobutyl methacrylate, 1H,1H,5H-octafluoropentyl methacrylate, ethylene, propylene, 1-butylene, 2 butylene, vinyl acetate, functional monomers (e.g., phosphorous-containing monomers), acid group monomers, and combinations thereof.

In some variations, the paint composition optionally further includes a combination of paint additives selected from the group consisting of matting agents, rheology modifiers, surfactants, defoamers, organic solvents, pH adjusters, UV stabilizers, dispersants, coalescents, biocides, matting agents, opaque polymers, mildewcides, and the like, and combinations thereof. It should be appreciated that any combination of these paint additives an be used. In should also be appreciated that each specific additive may refer to a combination of such additives. Typically, the paint additives other than the matting agent are each independently present in an amount from about 0.01 to 10 weight percent. In a refinement, the primer topcoat paint composition independently includes 0.1 to 5 weight percent rheology modifiers, 0.01 to 3 weight percent surfactants, 0.01 to 5 weight percent defoamers, 0.01 to 3 weight percent dispersants, 0.1 to 3 weight percent coalescents, 0.01 to 5 weight percent biocides, 0.01 to 3 weight percent mildewcides, 0.01 to 3 weight pH adjusters, 0.1 to 10 weight percent opaque polymer, 0.2 to 40 matting agents, and combinations thereof. Typically, the additives are present in a combined total amount from about 0.1 to 50 weight percent of the total weight of the paint composition.

As set forth above, the primer topcoat paint composition can include a matting agent to adjust the gloss to a lower sheen. The matting agent can be any extender pigment, such as silicas, zinc oxide, nepheline syenite, calcined kaolin, diatomaceous earth, mica, calcium carbonate, and the like. In a refinement, the matting agent is present in an amount from about 0.2 to 40 weight percent of the dry weight of the paint composition.

In another variation, the primer topcoat paint composition includes one or more pigments. Suitable pigments are azo dyes, phthalocyanine, anthraquinone dyes, inorganic pigments and carbon black, powdered metals, metal compounds (e.g., zinc phosphate), and combinations thereof. Examples of inorganic pigments include, but are not limited to, titanium oxide, calcium carbonate, iron oxides (black, yellow and red), zinc oxide, and the like, and combinations thereof. In a refinement, the primer topcoat paint composition includes about 1 to 40 weight percent titanium dioxide ($TiO_2$). In a refinement, the primer topcoat paint composition includes about 20 to 30 weight percent titanium dioxide ($TiO_2$).

In another variation, the primer topcoat paint composition includes the first acrylic copolymer in an amount from about 10 to 50 weight percent; and the second acrylic copolymer in an amount from about 1 to 10 weight percent with the balance being water and a combination of paint additives as set forth above.

In another embodiment, a method of coating a substrate with the primer topcoat paint composition set forth above is provided. The method includes a step of applying a primer topcoat paint composition to a substrate surface to form a coated substrate. The primer topcoat paint composition includes a first acrylic copolymer that is not a styrene acrylic copolymer, a second acrylic copolymer that is a styrene acrylic copolymer, and water. As set forth above, the first acrylic copolymer is present in the primer topcoat paint composition in an amount by weight that is at least 5 times greater than that of the second acrylic copolymer. Additional details of the primer topcoat paint composition are set forth above. The coated substrate is allowed to dry (i.e., dried) at ambient temperature. Typically, ambient temperature is from about 15° C. to about 30° C. Characteristically, the primer topcoat paint composition is applied without having to apply separate primer and topcoat layers.

In a variation, the paint composition is formed by a formulation process that includes a grind step and a letdown step. During the grind step, solvent (water), dispersant, defoamer, titanium oxide, and extender pigments are mixed together. During the letdown, the binder polymer, the mildewcide, the rheology modifier, and the biocide are added to the grind product.

The following examples illustrate the various embodiments of the present invention. Those skilled in the art will recognize many variations that are within the spirit of the present invention and scope of the claims.

The experimental compositions set forth below demonstrate the superior properties of the embodiments and variation set forth above with respect to sealing, adhesion, hiding, stain blocking, tintablility, scrubbable and washable.

1. Flat White Primer Topcoat Paint Composition

Table 1 provides an example of a flat white paint composition formed in accordance with the present invention. FIGS. 1A and 1B provides Table 2 which is a summary of the test methods and abbreviations used in the properties tables of FIGS. 2-7. Table 3 (FIG. 2) provides a summary of the measured properties for a paint coating formed from the flat white composition.

TABLE 1

Flat white composition weight percentages.

| Generic Description | Wt % |
|---|---|
| Coalescing Agent | 0.39 |
| Defoamer | 0.22 |
| Dispersant | 0.47 |
| Extender - Calcined Diatomaceous Earth | 4.26 |
| Extender - Nepheline Syenite | 25.56 |
| Opaque Polymer | 0.77 |
| pH Buffer | 0.07 |
| Polymer - Acrylic | 16.42 |
| Preservative | 0.73 |

TABLE 1-continued

Flat white composition weight percentages.

| Generic Description | Wt % |
|---|---|
| Rheology Modifier - Attapulgite Clay | 0.93 |
| Rheology Modifier - HEC | 0.42 |
| Sodium Nitrite | 0.04 |
| Surfactant | 0.23 |
| Tetrasodium pyrophosphate | 0.12 |
| TiO$_2$ Slurry | 27.26 |
| Water | 22.13 |

2. Eggshell White Primer Topcoat Paint Composition

Table 4 provides an example of an eggshell white paint composition formed in accordance with the present invention. Table 5 (FIG. 3) provides a summary of the measured properties for a paint coating formed from the eggshell white composition.

TABLE 4

Eggshell white composition weight percentages.

| Generic Description | Wt % |
|---|---|
| Coalescing Agent | 1.63 |
| Defoamer | 0.42 |
| Dispersant | 1.12 |
| Extender - Calcium Carbonate | 3.26 |
| Extender - Silicon Dioxide | 6.4 |
| Opaque Polymer | 6.05 |
| pH buffer | 0.14 |
| Polymer - Acrylic | 32.29 |
| Preservative | 0.83 |
| Rheology Modifier - Associative High Shear | 0.93 |
| Rheology Modifier - Attapulgite Clay | 0.47 |
| Rheology Modifier - HEC | 0.30 |
| Sodium Nitrite | 0.05 |
| Surfactant | 0.47 |
| TiO$_2$ Slurry | 25.18 |
| Water | 20.47 |

3. Semi-Gloss Primer Topcoat White

Table 6 provides an example of a semi-gloss white paint composition formed in accordance with the present invention. Table 7 (FIG. 4) provides a summary of the measured properties of a paint coating formed from the semi-gloss white composition.

TABLE 6

Semi-gloss white composition weight percentages.

| Generic Description | Wt % |
|---|---|
| Coalescing Agent | 2.27 |
| Defoamer | 0.3 |
| Dispersant | 0.2 |
| Extender - Nepheline Syenite | 0.49 |
| Extender - Kaolin | 1.23 |
| Opaque Polymer | 7.89 |
| pH buffer | 0.07 |
| Polymer - Acrylic | 39.37 |
| Preservative | 0.89 |
| Rheology Modifier - Associative High Shear | 2.07 |
| Rheology Modifier - Attapulgite Clay | 0.49 |
| Rheology Modifier - Low Shear | 0.54 |
| Sodium Nitrite | 0.05 |
| Surfactant | 0.3 |
| TiO2 Slurry | 24.77 |
| Water | 19.07 |

4. Deep Flat Paint Composition

Table 8 provides an example of a deep flat paint composition formed in accordance with the present invention. Table 9 (FIG. 5) provides a summary of the measured properties for a paint coating formed from the deep flat paint composition.

TABLE 8

Deep Flat paint composition weight percentages.

| Generic Description | Wt % |
|---|---|
| Coalescing Agent | 0.95 |
| Defoamer | 0.27 |
| Dispersant | 0.56 |
| Extender - Nepheline Syenite | 26.48 |
| Extender-Calcined Diatomaceous Earth | 4.25 |
| pH Buffer | 0.05 |
| Polymer - Acrylic | 26.39 |
| Preservative | 1.01 |
| Rheology Modifier - Attapulgite Clay | 1.14 |
| Rheology Modifier - HEC | 0.85 |
| Sodium Nitrite | 0.05 |
| Surfactant | 0.14 |
| Tetrasodium pyrophosphate | 0.19 |
| Water | 37.67 |

5. Eggshell Deep

Table 10 provides an example of an eggshell deep paint composition formed in accordance with the present invention. Table 11 (FIG. 6) provides a summary of the measured properties for a paint coating formed from the eggshell deep paint composition.

TABLE 10

Eggshell deep paint composition weight percentages.

| Generic Description | Wt % |
|---|---|
| Coalescing Agent | 2.11 |
| Defoamer | 0.69 |
| Dispersant | 0.95 |
| Extender - Nepheline Syenite | 15.76 |
| Fluoro Additive | 0.17 |
| Opaque Polymer | 0.63 |
| pH Buffer | 0.21 |
| Polymer - Acrylic | 45.17 |
| Preservative | 0.86 |
| Rheology Modifier - Associative High Shear | 2.21 |
| Rheology Modifier - Attapulgite Clay | 0.32 |
| Rheology Modifier - HEC | 0.42 |
| Rheology Modifier - Low Shear | 0.63 |
| Sodium Nitrite | 0.05 |
| Surfactant | 0.32 |
| Water | 29.52 |

6. Semi-Gloss Deep

Table 12 provides an example of a semi-gloss deep paint composition formed in accordance with the present invention. Table 13 (FIG. 7) provides a summary of the measured properties for a paint coating formed from the semi-gloss deep paint composition.

TABLE 12

Semi-gloss deep paint composition weight percentages.

| Generic Description | Wt % |
|---|---|
| Coalescing Agent | 2.17 |
| Defoamer | 0.35 |
| Dispersant | 0.71 |

TABLE 12-continued

Semi-gloss deep paint composition weight percentages.

| Generic Description | Wt % |
|---|---|
| Extender - Kaolin | 8.69 |
| Extender - Nepheline Syenite | 1.09 |
| Fluoro Additive | 0.33 |
| pH Buffer | 0.16 |
| Polymer - Acrylic | 54.2 |
| Preservative | 0.88 |
| Rheology Modifier - Associative High Shear | 1.96 |
| Rheology Modifier - Attapulgite Clay | 0.43 |
| Rheology Modifier - HEC | 0.19 |
| Rheology Modifier - Low Shear | 1.25 |
| Sodium Nitrite | 0.05 |
| Surfactant | 0.22 |
| Water | 27.32 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A primer topcoat paint composition comprising:
a first acrylic copolymer that is not a styrene acrylic copolymer, the first acrylic copolymer having a minimum film forming temperature less than about 20° C., wherein the first acrylic copolymer is present in an amount from about 10 to 50 weight percent of the total weight of the primer topcoat paint composition;
a first matting agent that is nepheline syenite;
a second matting agent including a component selected from the group consisting of silicas, zinc oxide, calcined kaolin, diatomaceous earth, mica, calcium carbonate, and combinations thereof;
a second acrylic copolymer that is a styrene acrylic copolymer, wherein the second acrylic copolymer is present in an amount from about 6.05 to 10 weight percent of the total weight of the primer topcoat paint composition; and
water, wherein the first acrylic copolymer is present in the primer topcoat paint composition in an amount by weight that is at least 5 times greater than that of the second acrylic copolymer.

2. The primer topcoat paint composition of claim 1 wherein the first acrylic copolymer is present in the primer topcoat paint composition in an amount by weight that is at least 7 times greater than that of the second acrylic copolymer.

3. The primer topcoat paint composition of claim 1 wherein the primer topcoat paint composition in an amount by weight that is at most 10 greater than that of the second acrylic copolymer.

4. The primer topcoat paint composition of claim 1 wherein the first acrylic copolymer is formed from one or more monomers selected from the group consisting of methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropylacrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H, 1H,3H-tetrafluoropropyl methacrylate, hexafluoro-iso-propyl methacrylate, 1H,1H,3H-hexafluorobutyl methacrylate, 1H,1H,5H-octafluoropentyl methacrylate, ethylene, propylene, 1-butylene, 2 butylene, vinyl acetate, functional monomers, acid group monomers, and combinations thereof.

5. The primer topcoat paint composition of claim 1 wherein the first acrylic copolymer is formed from one or more monomers selected from the group consisting of methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, and combinations thereof.

6. The primer topcoat paint composition of claim 1 wherein the second acrylic copolymer is formed from substituted or unsubstituted styrene and one or more monomers selected from the group consisting of methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropylacrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H, 1H,3H-tetrafluoropropyl methacrylate, hexafluoro-iso-propyl methacrylate, 1H,1H, 3H-hexafluorobutyl methacrylate, 1H,1H,5H-octafluoropentyl methacrylate, ethylene, propylene, 1-butylene, 2 butylene, vinyl acetate, functional monomers, acid group monomers, and combinations thereof.

7. The primer topcoat paint composition of claim 1 wherein the second acrylic copolymer is formed from substituted or unsubstituted styrene and one or more monomers selected from the group consisting of methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, and combinations thereof.

8. The primer topcoat paint composition of claim 1 wherein the combination of paint additives includes components selected from the group consisting of rheology modifiers, surfactants, defoamers, organic solvents, pH adjusters, UV stabilizers, dispersants, coalescents, biocides, opaque polymers, mildewcides, and combinations thereof.

9. The primer topcoat paint composition of claim 1, wherein the primer topcoat paint composition includes 0.1 to 5 weight percent rheology modifiers, 0.01 to 3 weight percent surfactants, 0.01 to 5 weight percent defoamers, 0.01 to 3 weight percent dispersants, 0.1 to 3 weight percent coalescents, 0.01 to 5 weight percent biocides, 0.01 to 3 weight mildewcides, 0.01 to 3 weight pH adjusters, 0.1 to 10 weight percent opaque polymer, and 0.2 to 40 matting agents.

10. The primer topcoat paint composition of claim 8 further comprising titanium dioxide.

11. The primer topcoat paint composition of claim 10 wherein the titanium dioxide is present in an amount of 1 to 40 weight percent.

12. A method comprising:
applying a primer topcoat paint composition to a substrate surface to form a coated substrate, the primer topcoat paint composition including a first acrylic copolymer that is not a styrene acrylic copolymer, a second acrylic copolymer that is a styrene acrylic copolymer, a first matting agent that is nepheline syenite, a second matting agent including a component selected from the group consisting of silicas, zinc oxide, calcined kaolin, diatomaceous earth, mica, calcium carbonate, and combinations thereof, and water, wherein the first acrylic copolymer is present in the primer topcoat paint composition in an amount by weight that is at least 5 times greater than that of the second acrylic copolymer and wherein the first acrylic copolymer has a minimum film forming temperature less than about 20° C. and wherein the first acrylic copolymer is present in an amount from about 10 to 50 weight percent of the total weight of the primer topcoat paint composition and the second acrylic copolymer is present in an amount from about 6.05 to 10 weight percent of the total weight of the primer topcoat paint composition; and
allowing the coated substrate to dry at ambient temperature, wherein the primer topcoat paint composition is applied without applying separate primer and topcoat coatings.

13. The method of claim 12 wherein the combination of paint additives includes components selected from the group consisting of a matting agent, rheology modifiers, surfactants, defoamers, organic solvents, pH adjusters, UV stabilizers, dispersants, coalescents, biocides, matting agents, opaque polymers, mildewcides, and combinations thereof.

14. The method of claim 13 further comprising titanium dioxide.

15. The primer topcoat paint composition of claim 1 further comprising a pH buffer.

16. The primer topcoat paint composition of claim 15 wherein the pH buffer is present in an amount of plus or minus 50 percent of 0.21 weight percent of the total weight of the primer topcoat paint composition.

17. The primer topcoat paint composition of claim 15 wherein the pH buffer is present in an amount of 0.07 weight percent of the total weight of the primer topcoat paint composition.

18. The primer topcoat paint composition of claim 1 further comprising a fluoro-additive.

19. The primer topcoat paint composition of claim 18 wherein the fluoro-additive is present in an amount of plus or minus 50 percent of 0.33 weight percent of the total weight of the primer topcoat paint composition.

20. The primer topcoat paint composition of claim 18 wherein the fluoro-additive is present in an amount of plus or minus 50 percent of 0.17 weight percent of the total weight of the primer topcoat paint composition.

21. The primer topcoat paint composition of claim 1 wherein the first acrylic copolymer is formed from a methacrylate monomer.

22. The primer topcoat paint composition of claim 1 wherein the second acrylic copolymer is formed from a methacrylate monomer.

* * * * *